Dec. 19, 1933.  C. L. HUMPHREY ET AL  1,940,302
OSCILLATING JOINT
Filed Feb. 17, 1930
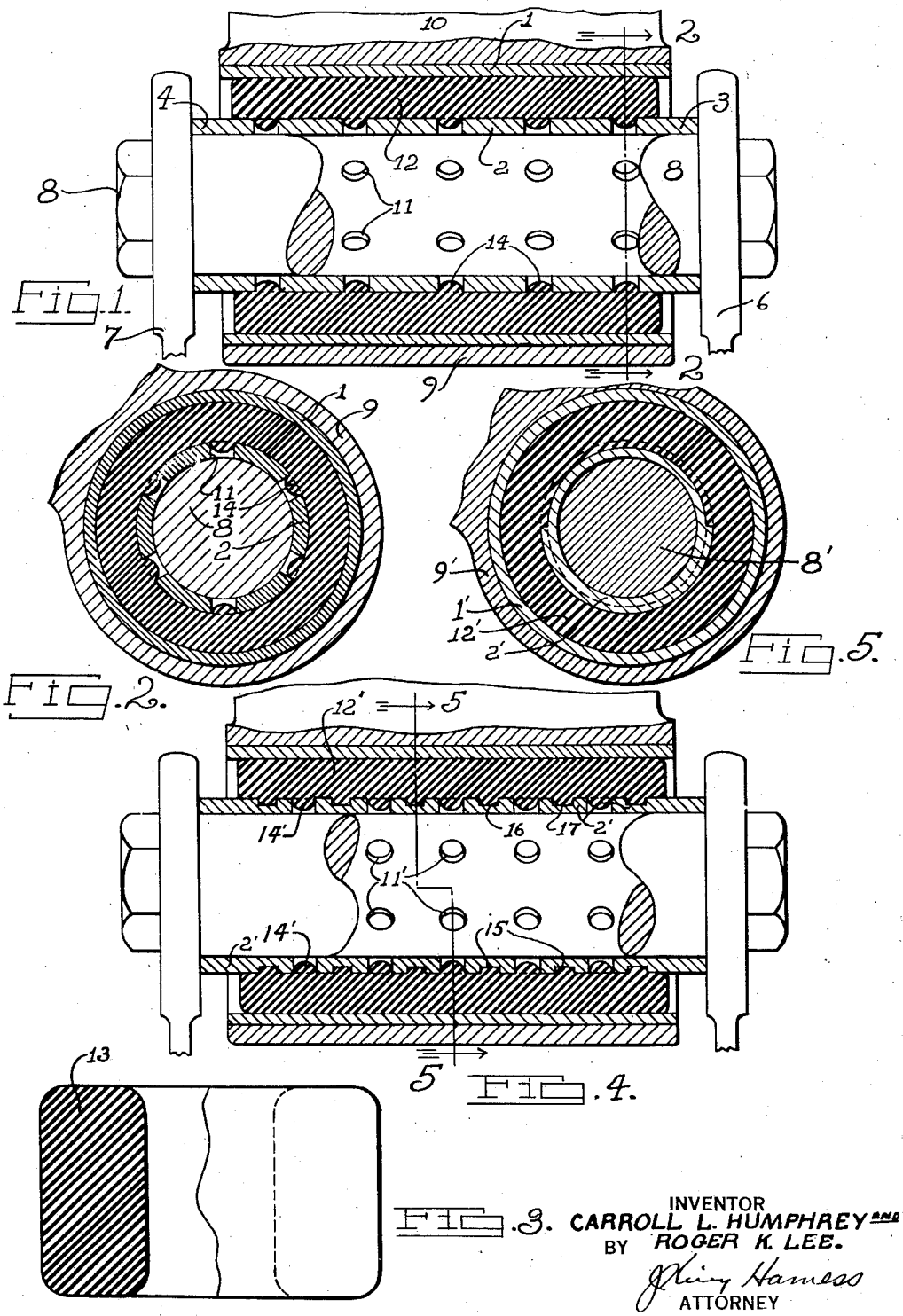
INVENTOR
CARROLL L. HUMPHREY and
BY  ROGER K. LEE.
ATTORNEY Patented Dec. 19, 1933

1,940,302

UNITED STATES PATENT OFFICE 1,940,302

OSCILLATING JOINT

Carroll L. Humphrey, Detroit, and Roger K. Lee, Highland Park, Mich., assignors to Chrysler Corporation, Detroit, Mich., a corporation of Delaware Application February 17, 1930. Serial No. 429,005

6 Claims. (Cl. 267—54)

The main objects of this invention are to provide an improved oscillating joint; to provide a joint which is particularly adapted for the spring shackles and shock absorber riggings of motor vehicles; to provide an improved yieldable connecting member between the movable parts of a joint of this kind which may be permanently retained under compression; to provide irregularities in the surface of one of said movable parts into which the material of said member is compressed for resisting relative axial movement of the part and connecting member; and to provide an oscillating joint of this kind in which the yieldable connecting member is secured against movement relative to a metallic part of the joint by a plurality of lugs which are formed in apertures in the metallic part during compression of the connecting member.

An illustrative embodiment of this invention is shown in the accompanying drawing, in which:

Fig. 1 is a central longitudinal section of an oscillating joint embodying our invention.

Fig. 2 is a transverse section taken on line 2—2 of Fig. 1.

Fig. 3 is an elevation, partly in section, illustrating a yieldable element of an oscillating joint as it appears before the parts thereof are assembled.

Fig. 4 is a central longitudinal section of a joint embodying a modified form of our invention.

Fig. 5 is a transverse section taken on line 5—5, Fig. 4.

Heretofore, in oscillating joints of the type which have a yieldable member permanently held under compression between concentric sleeves, it has been difficult to frictionally hold the connecting member against axial movement relative to the inner sleeve for the area of the inner periphery of the connecting cylinder which engages the outer periphery of the inner sleeve is substantially less than the contacting areas of the connecting cylinder and outer sleeve. As a result of this condition the metallic parts of the joint shift into engagement with each other and produce objectionable squeaks and grinding noises during operation.

In this invention, the yieldable connecting cylinder is secured against axial movement relative to the inner sleeve by providing the latter with peripheral grooves or apertures or with both, for receiving peripheral rings and lugs respectively, which are formed on the connecting member during its compression.

In the form shown in Figs. 1 and 2, the oscillating joint is illustrated in conection with a spring shackle and it comprises an outer sleeve 1 and an inner sleeve 2. The end portions 3 and 4 of the inner sleeve extend beyond the extremities of the outer sleeve 1. Adjacent the extremities of the innner sleeve 2 are shackle bars 6 and 7 which are firmly clamped thereon by a bolt 8. The outer sleeve 1 is rigidly secured in an eye 9 of a support or bracket 10 and the inner sleeve is provided with a plurality of apertures 11.

The sleeves 1 and 2 are yieldably connected together by a cylinder 12, preferably comprising rubber, which is permanently compressed between the two sleeves. In assembling the joint, a rubber ring 13 substantially of the shape shown in Fig. 3, is compressed by a hydraulic pressure or other suitable means between the sleeves 1 and 2. During compression of the ring 13 to the shape of the cylinder 12, some of the rubber or other yieldable material is compressed into the apertures 11 forming lugs 14 on the inner periphery of the cylinder 12 which positively secure the cylinder 12 against movement relative to the inner sleeve 2.

In the form of our invention shown in Figs. 4 and 5, the joint comprises an outer sleeve 1', an inner sleeve 2' and an intermediate yieldable cylinder 12' which connects the two sleeves together. Formed on the outer periphery of the inner sleeve 2' are grooves 15 which have sides 16 that are substantially normal to the longitudinal axis of the joint. The inner sleeve 2' is also provided with a plurality of apertures 11'.

When the cylinder 12' is compressed between the sleeves 1' and 2' in the above manner, portions of its inner periphery are forced into the grooves 15 and apertures 11' forming peripheral rings 17 and lugs 14' which prevent the cylinder 12' from shifting relative to the inner sleeve 2'.

Although but two specific embodiments of this invention have herein been shown and described, it will be understood that various changes including the size, shape and arrangement of parts, may be made without departing from the spirit of our invention and it is not our intention to limit its scope other than by the terms of the appended claims.

We claim:

1. An oscillating joint comprising an inner member having a plurality of apertures therein, a support surrounding said inner member, and a rubber cylinder compressed between said inner member and said support having substantial uniform wall thickness between adjacent surfaces thereof, portions of said cylinder being engaged in said apertures and adapted to prevent relative axial movement and rotation of said inner member and rubber cylinder.

2. An oscillating joint comprising an inner member having peripheral apertures, a support surrounding said inner member, and means having substantial uniform wall thickness between adjacent surfaces of said support and inner member yieldably connecting said inner member to said support and having portions engaged in said apertures.

3. An oscillating joint comprising an inner sleeve having a plurality of apertures and peripheral grooves, a support surrounding said inner sleeve, and a cylinder yieldably connecting said sleeve and support having peripheral rings and lugs engaged in said grooves and apertures respectively, corresponding portions of said cylinder being of substantially the same thickness at all radial cross sections thereof.

4. In a spring support, an outer sleeve rigidly mounted in said support, an inner sleeve in said outer sleeve having peripheral apertures therein, the end portions of said inner sleeve protruding the extremities of said outer sleeve, a pair of shackle bars, one adjacent each end of said inner sleeve, means firmly clamping said shackle bars on the ends of said sleeve, and a rubber cylinder compressed between said sleeves having corresponding portions of all radial cross sections substantially equal in thickness and having portions compressed into said apertures forming lugs for preventing movement of said inner sleeve relative to said cylinder, the outer sleeve being held against axial movement relative to said cylinder by frictional engagement therewith.

5. The method of making an oscillating joint which consists in arranging an inner sleeve having apertures therein within a tubular support in spaced relation to the walls thereof, and simultaneously compressing rubber between said walls and the periphery of said sleeve and into said apertures.

6. In a spring support, an oscillating joint comprising an outer sleeve rigidly mounted in said support, an inner sleeve within said outer sleeve having a plurality of apertures therein, and a cylinder connecting said sleeves having lugs extending into said apertures for positively securing said inner sleeve and said cylinder against relative axial movement and rotation, corresponding portions of all radial cross sections of said cylinder being of substantially the same thickness.

ROGER K. LEE.
CARROLL L. HUMPHREY.